United States Patent [19]

Foissac et al.

[11] Patent Number: 4,772,894

[45] Date of Patent: Sep. 20, 1988

[54] DEVICE FOR WIND BRACING THE MEMBERS OF A LATTICE MAST AND LATTICE MAST PROVIDED WITH SAID DEVICES

[75] Inventors: Yves Foissac, Famars; Guy Guislain, Maulde; Frédéric Ngo, St Amand Les Eaux; Philippe Bertin, Lille, all of France

[73] Assignee: Laboratoire d'Etudes et de REcherches Chimiques (LERC) S.A., St. Amand Les Eaux, France

[21] Appl. No.: 745,940

[22] Filed: Jun. 18, 1985

[30] Foreign Application Priority Data

Jun. 18, 1984 [FR] France .................. 84 09999

[51] Int. Cl.⁴ .............................................. H01Q 9/34
[52] U.S. Cl. ...................................... 343/875; 343/890; 343/896; 343/874; 52/110; 52/655

[58] Field of Search ............... 343/874, 875, 871, 890, 343/896; 52/110, 654, 655

[56] References Cited

U.S. PATENT DOCUMENTS

| | | | |
|---|---|---|---|
| 2,583,287 | 5/1948 | Andrews | 343/875 |
| 3,874,802 | 4/1975 | Lindsey | 52/655 |
| 4,356,498 | 10/1982 | Pollard | 343/890 |
| 4,601,152 | 7/1986 | Coppa | 52/637 |

Primary Examiner—William L. Sikes
Assistant Examiner—Doris J. Johnson
Attorney, Agent, or Firm—Kerkam, Stowell, Kondracki & Clarke

[57] ABSTRACT

The invention relates to a device for wind bracing of the vertical members of a lattice mast. It is characterized in that it is provided at its ends (5, 6) with detachable means (8, 9) for joining it to its vertical members, which in turn are provided with complementary means (10).

7 Claims, 4 Drawing Sheets

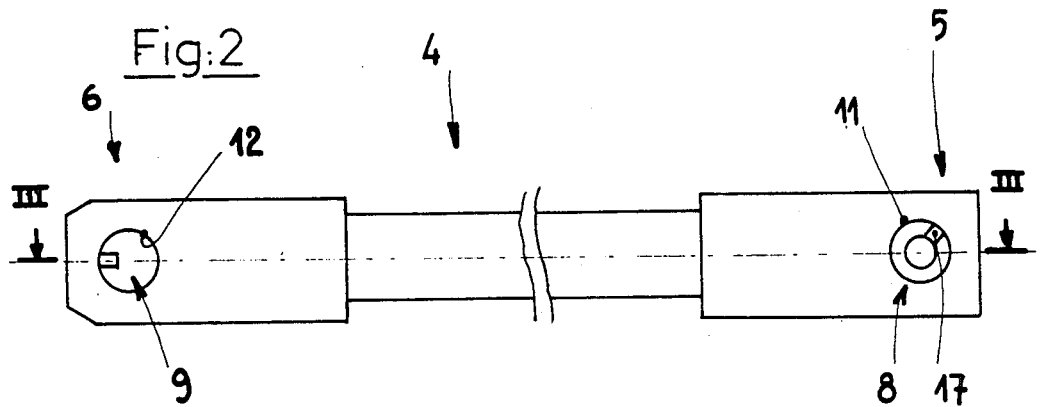
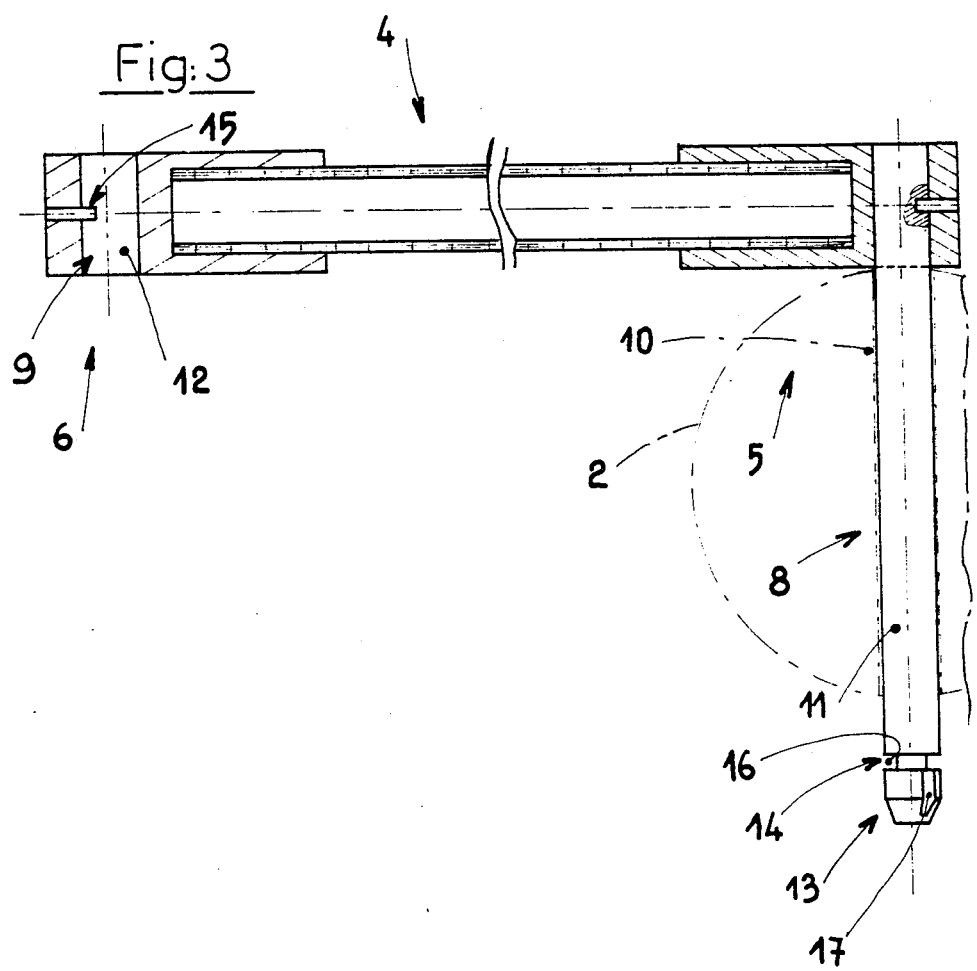

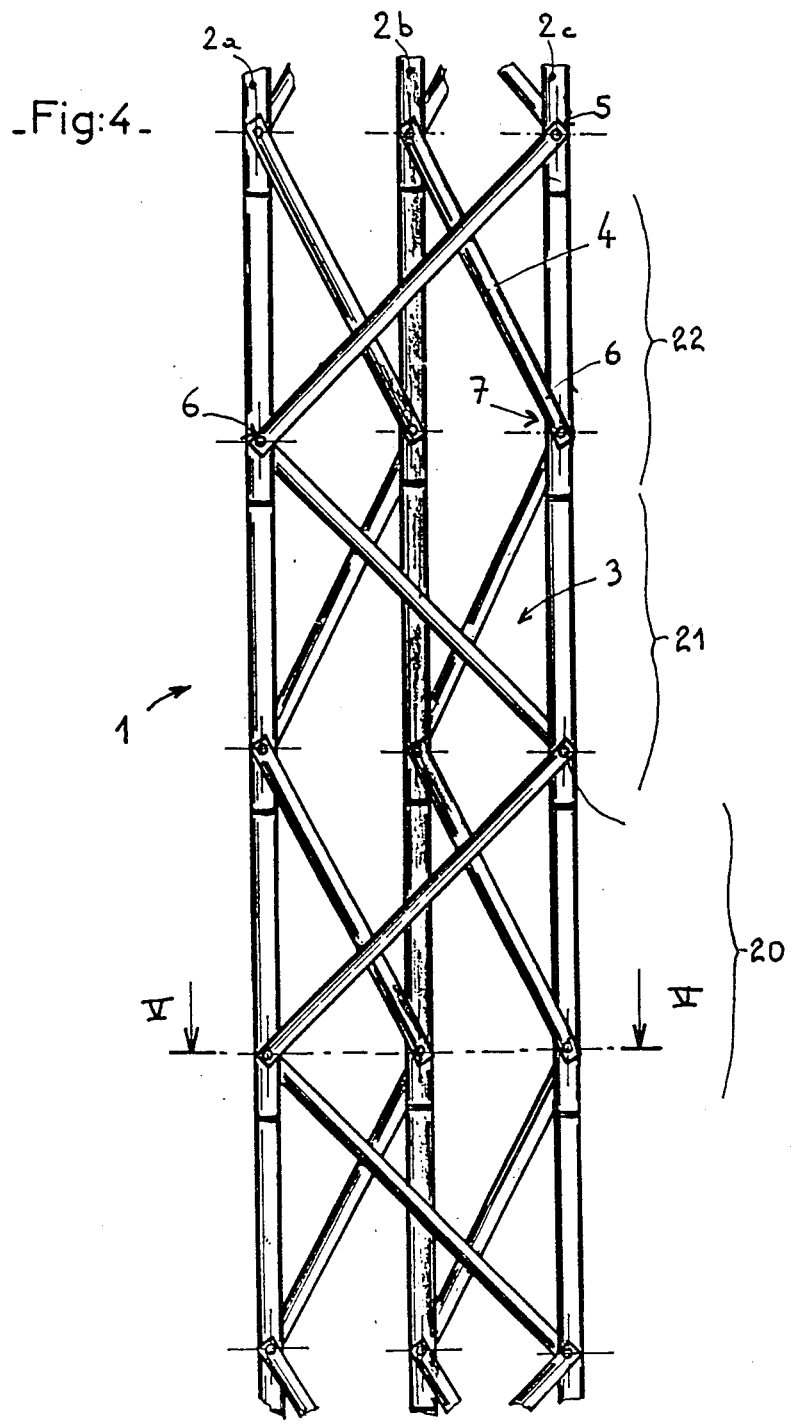

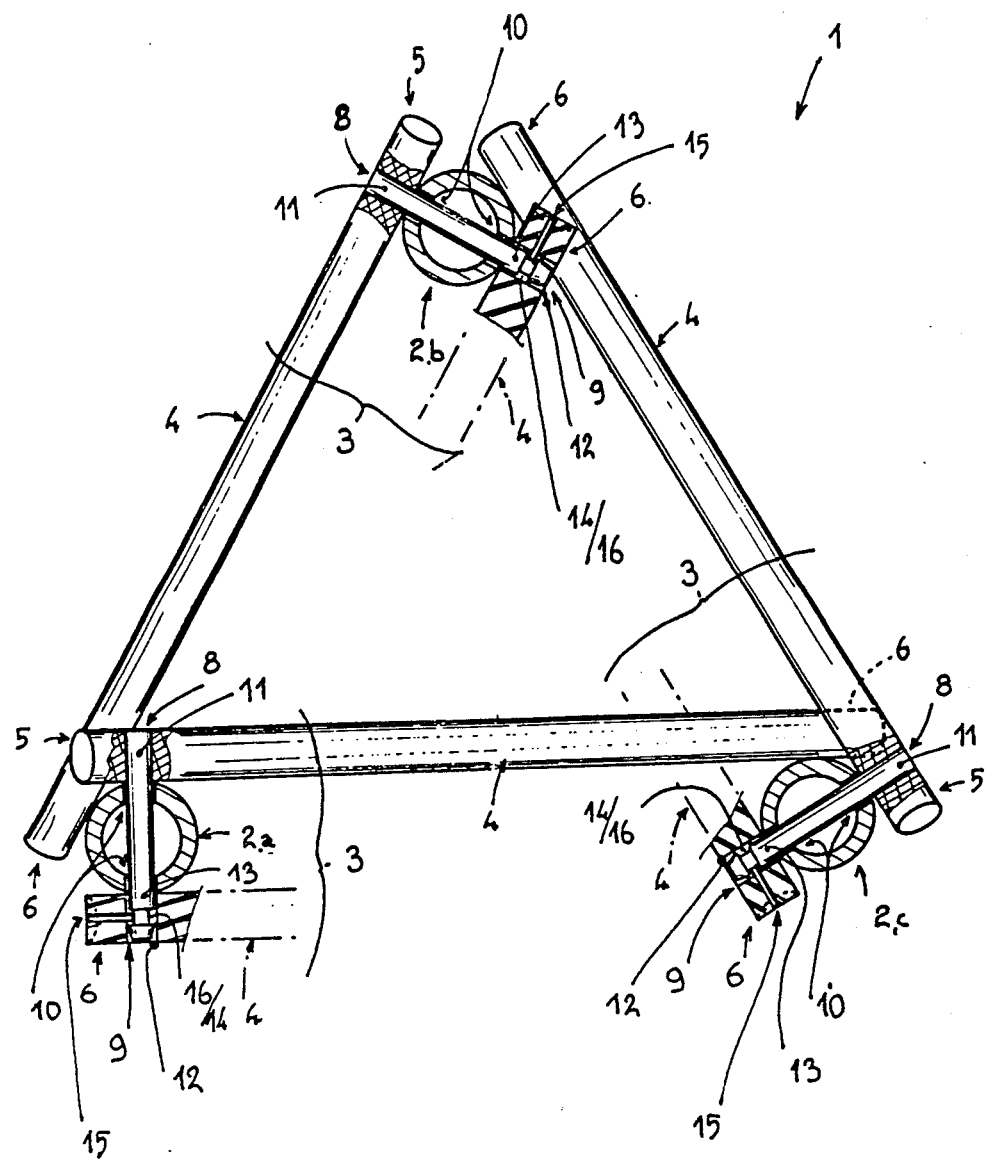

DEVICE FOR WIND BRACING THE MEMBERS OF A LATTICE MAST AND LATTICE MAST PROVIDED WITH SAID DEVICES

RELATED APPLICATIONS

This application is related to the following applications filed concurrently herewith:

1. "Cylindrical Mast Element For End To End Assembly with Other Elements So As To Constitute a Mast", Guy Guislain and Yves Foissac, U.S. Ser. No. 745,934, now U.S. Pat. No. 4,656,804 corresponding to French application No. 84.09.998.

2. "Device for Raising A Mast And Mast Raised With The Aid Of Such A Device", Jean Paul Perek, U.S. Ser. No. 745,937, now U.S. Pat. No. 4,677,444 corresponding to French application No. 84.10.002.

3. "Articulation Device Of A Mast And Mast Articulated With This Device", Guy Guislain, U.S. Ser. No. 745,933, corresponding to French application No. 84.10.001.

The subject matter of each of said related applications is hereby incorporated by reference.

FIELD OF THE INVENTION

The present invention relates to a device for cross-bracing or wind bracing the members of a lattice mast, as well as to a lattice mast provided with such wind bracing devices.

The invention relates more particularly, but not solely, to masts intended for supporting provisional broadcasting or receiving antennas of considerable weight, such as certain antennas used for military or civilian purposes, at a great height above the ground, for instance 30 to 35 meters.

BACKGROUND OF THE INVENTION

Taking into account the height and weight of these antennas, their mast must be capable of withstanding considerable strain. Very strong girders therefore become a necessity.

To this end, instead of a mast of the standard type, embodied by a sole vertical member, which for the sake of strength must have an excessively large cross section and weight, masts having latticework girders are generally used, and these masts are therefore commonly known as "lattice masts".

These lattice masts comprise at least three vertical members, which are generally cylindrical and which are held together by a triangulation embodied by wind bracing devices, each of which is associated at its ends with two of the vertical members at points which embody assembly junctions.

To facilitate transporting them, it is known for these lattice masts to be embodied in a plurality of sections.

At the site where the mast will be used, the sections are then laid on the ground so they can be assembled end to end. Then the assembled mast is raised vertically, and it is kept in this position by a bracing system.

Each of these mast sections comprises three assembly parts joined by wind bracing devices corresponding to this part of the mast, which thus becomes a unit that can no longer be dismantled.

When they are used, these sections are simply placed end to end and assembled by some known means, such as a bolted connection, at each end to end junction.

Unfortunately, aside from the fact that a special machine, such as a crane, must be used to raise them, such masts have the disadvantage of being bulky, because each section is in the form of a latticework girder having a cross section of considerable bulk.

In the case of the standard mast, comprising a single vertical member, the problem of great length is comparable and is likewise solved by embodying the member in a plurality of sections assembled end to end upon being used, and the problem of large cross-sectional bulk is also present, although less acute. Nevertheless, it is not at all necessary to use a machine to raise the mast, because for this kind of standard mast it is sufficient to mount the antenna on the top element, and then to insert this top element into a vertical guide shaft which is placed a certain distance above the ground, via a supporting framework; then, in order to raise the antenna to the desired height, the additional elements successively engage the bottom of the shaft, which progressively raises the top of the mast.

Unfortunately, with the lattice masts known at present, even if they are divided into a plurality of sections it is impossible to use this method to erect them, because the means for joining the sections and their wind bracing devices prevents their translation in a shaft; furthermore, taking into account the cross section of the lattice mast, this shaft would be of excessively large dimensions.

OBJECT AND SUMMARY OF THE INVENTION

If is accordingly an object of the present invention to devise a lattice mast which is less bulky to transport.

A further object of the invention is to make it easy to erect such a mast.

To this end, the wind bracing device according to the invention is characterized in that it is provided at its ends with detachable connecting devices for attachment to the vertical members, which in their turn are provided with comparable devices.

The subject of the invention is a lattice mast provided with these devices.

The invention will be better understood from the ensuing description of a preferred embodiment, given as a non-limiting example, taken in conjunction with the drawings.

BRIEF DESCRIPTION OF THE DRAWINGS

FIG. 2 is the device seen from the front; and

FIG. 3 shows the device in a section taken along the line III—III of FIG. 2.

FIG. 4 shows a portion of the elevation of the mast assembly.

FIG. 5 shows the assembly in a section taken along line V—V of FIG. 4.

DESCRIPTION OF THE PREFERRED EMBODIMENT

Figure 1:
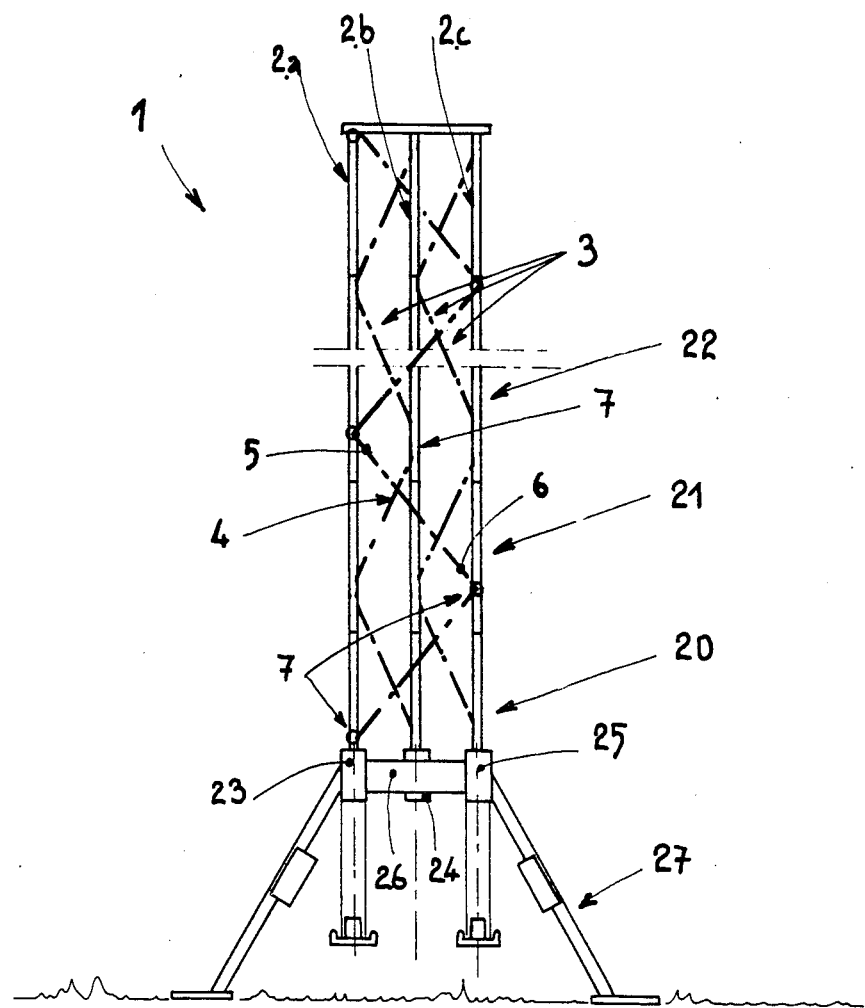
FIG. 1 is an elevation of the lattice mast.

Turning now to the drawings, and particularly FIGS. 1 and 4, the lattice mast 1 includes at least three vertical members $2_a$, $2_b$, $2_c$, which are cylindrical and have parallel axes and are held together by a triangulation (see FIG. 5) formed by the wind bracing devices 4, which are joined at their upper and lower ends 5 and 6, respectively, to two of the vertical members at points 7 representing assembly junction points.

FIG. 1 shows, in schematic form, the entire structure as assembled, and FIG. 4 shows a portion of the lattice mast assembly in more detail.

The vertical members are preferably connected in pairs by networks 3 which are distinct from the wind bracing devices and are arranged in zigzag fashion, one after another, in planes parallel to the planes in which the two vertical members are located.

According to an essential characteristic of the invention, the wind bracing or crossbracing means 4 are provided at their ends 5, 6 with detachable means 8, 9 for joining with their vertical members, which are in turn provided for this purpose with complementary means 10.

According to another characteristic of the invention:

first, the complementary means carried by the vertical members comprise holes 10 each of which is radial to the axis of its vertical members and perpendicular to the plane of the two members connected by these devices; and second, the means 8 of one of the ends 5 comprises a cylindrical pin 11, having a diameter corresponding to that of the radial holes in the vertical members, one of which is traversed, during assembly, by said pin, while the means 9 at its other end 6 comprises a hole 12 having an axis parallel to that of the pin 11 and a diameter corresponding to that of the pin and which, during assembly, receives the pin 11 of the contiguous wind bracing device.

To this end, the pin has a length sufficient for it to be able to traverse one of the two pieces, that is, the vertical member and the wind bracing device, and to engage the other piece at least partially.

According to another characteristic of the invention, each pin 11 has a free end 13 which is provided with a means 14 cooperating with a complementary means 15 carried by the hole 12 of another wind bracing device, so as to interlock them.

The means 14 with which the free end 13 of the pin is provided comprises a circular throat 16 communicating with a groove 17 which is substantially of the same size and the same depth and extends from the throat 16 to the free end 13 of the pin, while the complementary means 15 with which the hole 12 is provided comprises a prong 15 forming an projection having dimensions corresponding to those of the throat 16 and the groove 17.

Because of this, the pin cannot engage the hole or be removed from it unless it is in a position of alignment determined by the relative positions of the groove 17 and the prong 15.

It is thus sufficient for this position to be different from that in which the device is placed after being mounted on the vertical members to assure self-locking.

Each vertical member may be realized in a plurality of sections 20, 21, 22, which upon assembly are joined end to end.

In this case, before the wind bracing devices are put in place, these vertical members 2$_a$, 2$_b$, 2$_c$ can be erected by guide shafts 23, 24, 25 in the manner similar to that used for conventional masts.

The shafts 23-25 are then joined by a support 26 resting on the ground via a suitable supporting framework 27 so that via the bottom of each shaft, it will be possible to add the vertical member elements in order to attain a mast of the correct height.

Preferably, one element at a time is added to each vertical member, and then the wind bracing devices are put in place, before recommencing the operation.

However, instead of joining the vertical member elements which are located at the same height in the mast, it is provided according to a characteristic of the invention that each wind bracing device, at its ends, join one vertical member element with another vertical member element which, (i.e., next higher or next lower) in the finished mast, will be located at a contiguous level, as can be seen in FIGS. 1 and 4.

What is claimed is:

1. A lattice mast system comprising:
   at least three vertical cylindrical members, said cylindrical members disposed in a triangular arrangement and having parallel axes, said members having bores extending radially therethrough, each of said vertical members being connected to each of the other vertical members by an associated network of wind bracing devices,
   each of said wind bracing devices having a first end and a second end, said first end of each device having a cylindrical pin projecting radially therefrom, said second end of each device containing a hole extending radially inwardly and having a diameter corresponding to that of the pin for releaseably engaging said pin, the pin being of sufficient length whereby a pin of one of said devices and a hole of another of said devices comprise a detachable means for joining said bracing devices with said vertical members through one of said bores in said vertical members, each of said networks of wind bracing devices being formed by connecting said wind bracing devices through said bores in a pair of vertical members in a zig zag fashion along the length of said vertical members, said wind bracing devices being alternately disposed in planes parallel to and on opposite sides of a plane containing said pair of vertical members.

2. A device according to claim 1, wherein each pin (11) has a free end (13) having groove means (14) for interlocking said device to another wind bracing device, and wherein each hole (12) is provided with a complementary projection means, each of said groove means being adapted to cooperate with a complementary projection means (15) carried by the hole (12) of said anohter wind bracing device, so as to interlock them.

3. A device according to claim 2, wherein the groove means (14) with which the free end (13) of the pin is provided comprises a circular throat (16) communicating with a groove (17) which is substantially of the same size and the same depth and extends from the throat (16) to the free end (13) of the pin, while the complementary projection means (15) with which the hole (12) is provided comprises a prong (5) forming a projection having dimensions corresponding to those of the throat (16) and the groove (17).

4. A wind bracing device adapted to be used in a lattice mast system comprising:
   a first end and a second end, said first end of said device having a cylindrical pin projecting radially therefrom, said second end of said device containing a hole extending radially inwardly and having a diameter corresponding to that of the pin, wherein said hole is adapted to receive and releaseably engage a pin of another of said wind bracing devices, and wherein said pin is of sufficient length to cooperate with, and be releasably engageable with, a hole of another of said devices.

5. A device according to claim 4 wherein each pin has a free end which is provided with a means for interlocking said pin with a hole of another wind bracing device, and said hole of said device has a means carried in said hole for cooperating with an interlocking means of a pin of another wind bracing device.

6. A device according to claim 5 wherein said means for interlocking carried by said free end of said pin further comprises a groove extending longitudinally from a top of said free end, and a circular throat disposed at an inward end of said groove.

7. A device according to claim 6 wherein said cooperating means carried in said hole comprises a prong projecting radially inwardly into said hole.

* * * * *

UNITED STATES PATENT AND TRADEMARK OFFICE
CERTIFICATE OF CORRECTION

PATENT NO. : 4,772,894
DATED : September 20, 1988
INVENTOR(S) : Foissac et al

It is certified that error appears in the above-identified patent and that said Letters Patent is hereby corrected as shown below:

On the Title Page, Item [73],
Assignee - "REcherches" should be --Recherches--
Column 4, claim 3, line 51 "5" should be --15--

Signed and Sealed this

Twenty-first Day of March, 1989

Attest:

DONALD J. QUIGG

Attesting Officer     Commissioner of Patents and Trademarks